US009666118B2

(12) United States Patent
Hsieh et al.

(10) Patent No.: US 9,666,118 B2
(45) Date of Patent: May 30, 2017

(54) TRANSPARENT DISPLAY APPARATUS

(71) Applicant: Chunghwa Picture Tubes, LTD., Taoyuan (TW)

(72) Inventors: Pei-Lin Hsieh, Taoyuan (TW); Hsiang-Tan Lin, Keelung (TW)

(73) Assignee: Chunghwa Picture Tubes, LTD., Taoyuan (TW)

( * ) Notice: Subject to any disclaimer, the term of this patent is extended or adjusted under 35 U.S.C. 154(b) by 0 days.

(21) Appl. No.: 14/872,151

(22) Filed: Oct. 1, 2015

(65) Prior Publication Data

US 2017/0098408 A1 Apr. 6, 2017

(51) Int. Cl.

| | |
|---|---|
| ***G09G 3/20*** | (2006.01) |
| ***G09G 5/02*** | (2006.01) |
| ***H04N 1/60*** | (2006.01) |
| ***H04N 9/73*** | (2006.01) |
| ***G09G 3/36*** | (2006.01) |

(52) U.S. Cl.

CPC ......... *G09G 3/2074* (2013.01); *G09G 3/3607* (2013.01); *G09G 2320/0276* (2013.01)

(58) Field of Classification Search

CPC combination set(s) only.
See application file for complete search history.

(56) References Cited

U.S. PATENT DOCUMENTS 5,576,870 A * 11/1996 Ohmae ............. G02F 1/133753 348/E9.027
6,084,647 A * 7/2000 Hatano .................. G02B 27/26 348/E13.033
6,198,523 B1 * 3/2001 Helbing ............... G02B 5/3025 345/101
8,659,725 B2 2/2014 Lo et al.
(Continued)

FOREIGN PATENT DOCUMENTS

JP 2011059215 3/2011
JP 2013025031 2/2013
(Continued)

OTHER PUBLICATIONS

"Office Action of Japan Counterpart Application", issued on Jan. 17, 2017, p. 1-p. 7.

*Primary Examiner* — Wesner Sajous
(74) *Attorney, Agent, or Firm* — Jianq Chyun IP Office

(57) ABSTRACT

A transparent display apparatus is provided. The transparent display apparatus includes a transparent display unit and a controller. The transparent display unit displays an image frame according to a display data signal and a transparency control signal. The controller receives the display data signal and the transparency control signal, determines a first gradation and a second gradation according to the display data signal and the transparency control signal respectively, and controls the transparent display unit to display the image frame according to the first and second gradations. The first and second gradations are respectively within an interval between two of three display states including a transparent state, a black state and a white state, such that a first and second display states determined based on the first and second gradations may cover all the display effects of the transparent state, the black state and the white state.

17 Claims, 10 Drawing Sheets

(56) References Cited

U.S. PATENT DOCUMENTS

| | | | | | |
|---|---|---|---|---|---|
| 2003/0063047 | A1* | 4/2003 | Starr | G09G 3/3655 | 345/32 |
| 2006/0103782 | A1* | 5/2006 | Adachi | G02F 1/1323 | 349/96 |
| 2008/0055221 | A1* | 3/2008 | Yabuta | G02F 1/13338 | 345/90 |
| 2009/0168009 | A1* | 7/2009 | Shibahara | C09K 19/12 | 349/186 |
| 2011/0051064 | A1* | 3/2011 | Matsumori | G02F 1/133711 | 349/123 |
| 2011/0063490 | A1* | 3/2011 | Ogita | G02F 1/133536 | 348/333.01 |
| 2013/0106922 | A1* | 5/2013 | Chen | G02F 1/133514 | 345/690 |
| 2014/0078451 | A1 | 3/2014 | Lou | | |
| 2016/0057411 | A1* | 2/2016 | Shinohara | H04N 13/0452 | 345/419 |

FOREIGN PATENT DOCUMENTS

| | | |
|---|---|---|
| JP | 2013142804 | 7/2013 |
| TW | 201348816 | 12/2013 |

* cited by examiner

TRANSPARENT DISPLAY APPARATUS

BACKGROUND OF THE INVENTION

1. Field of the Invention

The present invention generally relates to an image processing technology, in particular, to a transparent display apparatus.

2. Description of Related Art

Generally, liquid crystal displays (LCDs) can be broadly classified into three types, namely, transmissive, reflective and transflective LCDs. With increases in applications of the displays, transparent display panel has been developed in recent years. The transparent display panel has a sufficient transparency rate, and therefore a user can look through the transparent display panel and observe the background scenery behind the transparent display panel. In addition to the inherent transparent display function, the transparent display panel may also be applied as an information display, and therefore may attract great attention of the market.

Current technology may display a transparent effect in an image frame displayed on the transparent display panel based on a gray-level gradation. The gray-level gradation may be a gradation of an interval from a black state (e.g., the minimal gray-level value of the gray-level gradation) to a white state (e.g., the maximal gray-level value of the gray-level gradation). For displaying the transparent effect, the current technology may convert one of the black state and the white state into a transparent state, so as to generate another gradation including the transparency state. Taking a transparent display panel adapted to a light box for example, the white state may be converted into the transparent state for generating a new gradation within an interval from the black state to the transparent state, such that the transparent effect may be presented depending on the transparent part of the new gradation. However, it should be noted that the white state may be incapable of being truly presented. On the other hand, for another type of the transparent display panel, if the black state is converted into the transparent state for presenting the transparent effect, the black state incapable of being truly presented.

From the above, for the current technology, the transparent effect may be presented only when a display effect of the black state or the white state is sacrificed, where the sacrificed display effect may be determined once the type of the transparent display panel has been decided. Besides, since the transparency directly depends on the gray-level values, an adjustment of the transparency may be very limited. Thereby, display effects of the transparent display panel and user experience is significantly affected.

SUMMARY OF THE INVENTION

Accordingly, the present invention is directed to a transparent display apparatus, which may display an image frame with the black state, the white state and the transparent state simultaneously, adaptively adjust the transparency of part or all regions in the image frame, and thereby may enhance the display effects of the transparent display apparatus and the user experience.

The invention provides a transparent display apparatus. The transparent display apparatus includes a transparent display unit and a controller. The transparent display unit displays an image frame according to a display data signal and a transparency control signal. The controller is coupled to the transparent display unit. The controller receives the display data signal and the transparency control signal, determines a first gradation of the image frame within an interval from a transparent state to a white state according to the display data signal, determines a second gradation of the image frame within an interval from a black state to the transparent state according to the transparency control signal, controls the transparent display unit to display the image frame according to the first gradation and the second gradation, and adjusts a transparency of the image frame according to a signal strength of the transparency control signal.

The invention provides another transparent display apparatus. The transparent display apparatus includes a transparent display unit and a controller. The transparent display unit displays an image frame according to a display data signal and a transparency control signal. The controller is coupled to the transparent display unit. The controller receives the display data signal and the transparency control signal, determines a first gradation of the image frame within an interval from a black state to a white state according to the display data signal, determines a second gradation of the image frame within an interval from the black state to a transparent state according to the transparency control signal, controls the transparent display unit to display the image frame according to the first gradation and the second gradation, and adjusts a transparency of the image frame according to a signal strength of the transparency control signal.

The invention provides another transparent display apparatus. The transparent display apparatus includes a transparent display unit and a controller. The transparent display unit includes a liquid crystal layer and a polarization element, and displays an image frame according to a display data signal and a transparency control signal. The controller is coupled to the transparent display unit. The controller receives the display data signal and the transparency control signal, controls an arranging direction of a plurality of liquid crystal molecules in the liquid crystal layer according to a gray-level part of the display data signal, and controls a polarization direction of the polarization element according to the transparency control signal.

Based on the above, the transparent display apparatuses disclosed by the embodiments of the invention may simultaneously use the display data signal and the transparency control signal to determine a first gradation and a second gradation respectively, so as to control the transparent display unit to display the image frame according to the first gradation and the second gradation. Thus, the transparency may be effectively adjusted, and the image frame may be effectively displayed with the transparent state, the black state and the white state, such that good display effects and user experience may be achieved.

In order to make the aforementioned and other features and advantages of the invention more comprehensible, embodiments accompanying figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
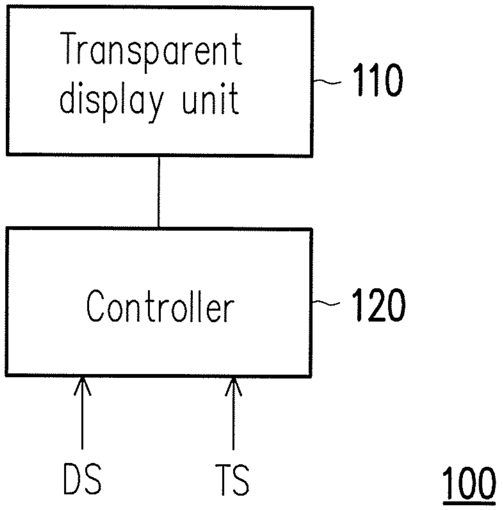
FIG. 1 is a block diagram illustrating a transparent display apparatus according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

The embodiments of the present invention respectively provide transparent display apparatuses which may use dual signals (e.g., a display data signal and a transparency control signal) to display an image frame, where the transparency control signal may be used for determining the transparency of the image frame and the corresponding control region thereof effectively. Through determining a first gradation within an interval between two of three display states (e.g., a transparent state, a black state and a white state) according to the display data signal, and determining a second gradation within an interval between another two of the three display states according to the transparency control signal, the embodiments of the present invention may display the image frame with all of the transparent state, the black state and the white state effectively based on the first gradation and the second gradation. Therefore, display effects of the transparent display apparatus may be enhanced, so as to achieve good user experience.

FIG. 1 is a block diagram illustrating a transparent display apparatus according to an embodiment of the invention. Referring to FIG. 1, the transparent display apparatus 100 includes a transparent display unit 110 and a controller 120, where the functionalities thereof are given as follows.

The transparent display unit 110 may be characterized by transparency, such as a liquid crystal display (LCD) panel or an organic light-emitting diode (OLED) display panel, or a combination thereof. The transparent display unit 110 may display an image frame according to a display data signal DS and a transparency control signal TS. It may be noted that the display data signal DS may include color information (e.g., RGB information) of the image frame, and the transparency control signal TS may include transparency information of the image frame, such as a signal strength of the transparency and a region controlled by the transparency control signal TS for adjusting the transparency in the image frame.

The controller 120 may be coupled to the transparent display unit 110. The controller 120 may be an image processor, which may receive and process the display data signal DS and the transparency control signal TS respectively, so as to control the transparent display unit 110 to display the image frame based on the display data signal DS and the transparency control signal TS. For instance, the controller 120 may transfer the processed display data signal DS and the transparency control signal TS to a display driver, such that the display driver may drive the transparent display unit 110 to display the image frame according to the processed display data signal DS and the transparency control signal TS. In another embodiment, the controller 120 may also be a combination of the image processor and the display driver, though the invention is not limited thereto.

In detail, the controller 120 may control the transparent display unit 110 to display the image frame with two gradations (e.g., a first gradation and a second gradation) according to the display data signal DS and the transparency control signal TS respectively. In particular, each of the two gradations may be determined within an interval between two of the transparent state, the black state and the white state, such that the two gradations may cover all the display effects of the transparent state, the black state and the white state. Therefore, the controller 120 may control the transparent display unit 110 to be capable of displaying the image frame with each of the transparent state, the black state and the white state. Details of the determination of the two gradations may be described later. In other words, the controller 120 may control the transparent display unit 110 to display the image frame with the transparent state, the black state and the white state simultaneously, rather than sacrifice the display effect of the black state or the white state.

It should be noted that, in the present embodiment, the controller 120 may adjust the transparency of the image frame according to the signal strength of the transparency control signal TS. In other words, the second gradation may be determined according to at least the transparent state.

It may be worth mentioning that, in the embodiments of the invention, the transparent state may be indicated as the maximum value of the transparency (e.g., the transparent display unit 110 is fully transparent (e.g., with a light transmittance of 100% or a transparency rate of 100%), such that the background behind the transparent display unit 110 may be visible at the front side clearly), the black state may be indicated as the minimal gray-level value, and the white state may be indicated as the maximal gray-level value, where the black state and the white state may be non-transparent.

Figure 2:
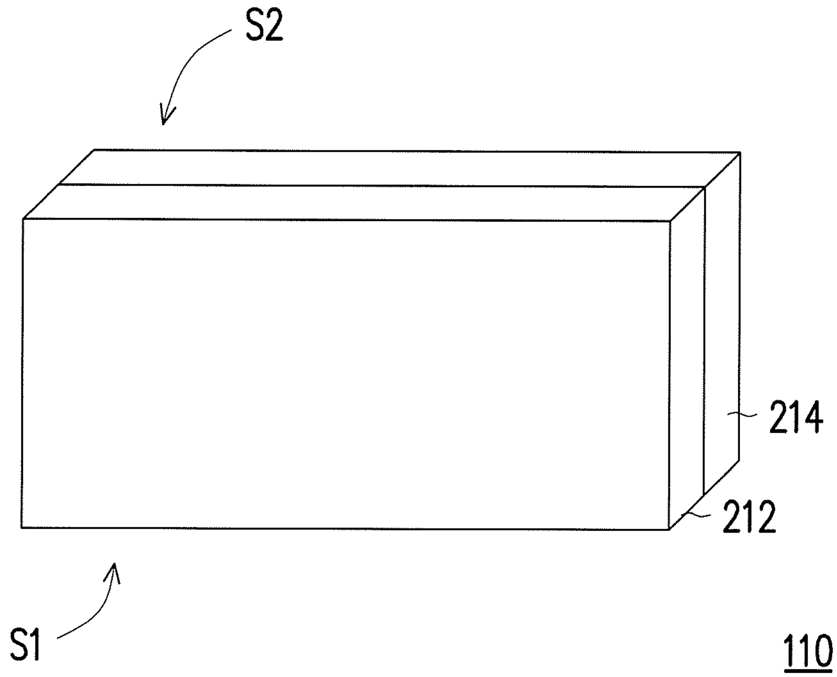
FIG. 2 is a schematic diagram illustrating a transparent display apparatus according to an embodiment of the invention.

Referring to FIG. 1 and FIG. 2, FIG. 2 is a schematic diagram illustrating a transparent display apparatus according to an embodiment of the invention, where a configuration of double transparent display panels is provided as follows.

In the present embodiment, the controller 120 may determine a first gradation of the image frame within an interval from a transparent state to a white state according to the display data signal DS, and may determine a second gradation of the image frame within an interval from a black state to the transparent state according to the transparency control signal TS. Then, the controller 120 may control the transparent display unit 110 to display the image frame according to the first gradation and the second gradation, and may adjust a transparency of the image frame according to a signal strength of the transparency control signal TS.

Specifically, the transparent display unit 110 may include a plurality of pixels, and the pixels may be divided into a first pixel group and a second pixel group, where the first pixel group may be controlled by the display data signal DS, and the second pixel group may be controlled by the transparency control signal TS. In addition, the transparent display unit 110 may include a first transparent display panel 212 and a second transparent display panel 214. The first transparent display panel 212 may be configured by the first pixel group, and the second transparent display panel 214 may be configured by the second pixel group, where the second transparent display panel 214 may be arranged in parallel with the first transparent display panel 212.

As illustrated in FIG. 2, the first transparent display panel 212 and the second transparent display panel 214 may be completely overlapped. A user may be located at a front side S1 of the transparent display apparatus 100 and watch the image frame displayed on the transparent display unit 110. Besides, a background at the back side S2 of the transparent display apparatus 100 may be visible to the user due to the high transparency rate of the transparent display apparatus 100.

In detail, The controller 120 may determine the first gradation according to a gray-level part of the display data signal DS, and may control at least one first pixel of the first pixel group, which may be configured on the first transparent display panel 212, to operate with a first display state determined by the interval from the transparent state to the white state according to the first gradation. In addition, the controller 120 may determine the second gradation according to the signal strength of the transparency control signal TS, and may control at least one second pixel of the second pixel group, which may be configured on the second transparent display panel 214, to operate with a second display state determined by the interval from the black state to the transparent state according to the second gradation.

More specifically, in an embodiment, the first display state may be one of the transparent state and the white state, the second display state may be one of the black state and the transparent state, and the controller 120 may control to display the image frame with one of the transparent state, the white state and the black state according to the first display state and the second display state, where the at least one first pixel overlaps with the at least one second pixel.

Thus, from a perspective of a first pixel and a second pixel overlapped with each other, if the gray-level part of the display data signal DS is represented within an interval from 0 (e.g., a gray-level value corresponding to the transparent state) to 1 (e.g., a gray-level value corresponding to the white state), the controller 120 may set the first gradation to be proportional to the gray-level value of the display data signal DS (e.g., same as the gray-level value). The controller 120 may use the first gradation as a first combining ratio for combining the transparent state and the white state, so as to determine the first display state which the first pixel may operate with. Similarly, if the signal strength of the transparency control signal TS is represented within an interval from 0 (e.g., a strength value corresponding to the black state) to 1 (e.g., a strength value corresponding to the transparent state), the controller 120 may set the second gradation to be proportional to the signal strength of the transparency control signal TS (e.g., same as the signal strength of the transparency control signal TS), and may use the second gradation as a second combining ratio for combining the black state and the transparent state, so as to determine the second display state which the second pixel may operate with.

Then, by a superposition of the first display state presented by the first pixel and the second display state presented by the second pixel, the image frame may be displayed with all of the transparent state, the black state and the white state.

In particular, when the first display state is one of the transparent state and the white state (i.e., the gray-level value of the display data signal DS is 0 and 1, respectively) and the second display state is one of the black state and the transparent state (i.e., the strength value of the transparency control signal TS is 0 and 1, respectively), the controller 120 may control to display the image frame with one of the transparent state, the white state and the black state according to the first display state and the second display state. The superposition results of the first display state and the second display state according to the display data signal DS and the transparency control signal TS according to the embodiments of FIG. 2 are listed in Table 1 below.

TABLE 1

| Gray-level value of display data signal | Strength value of transparency control signal | Superposition of first display state and second display state |
|---|---|---|
| 0 | 0 | Black state |
| 0 | 1 | Transparent state |
| 1 | 0 | White state |
| 1 | 1 | A combination of the white state and the transparent state |

Figure 3A:
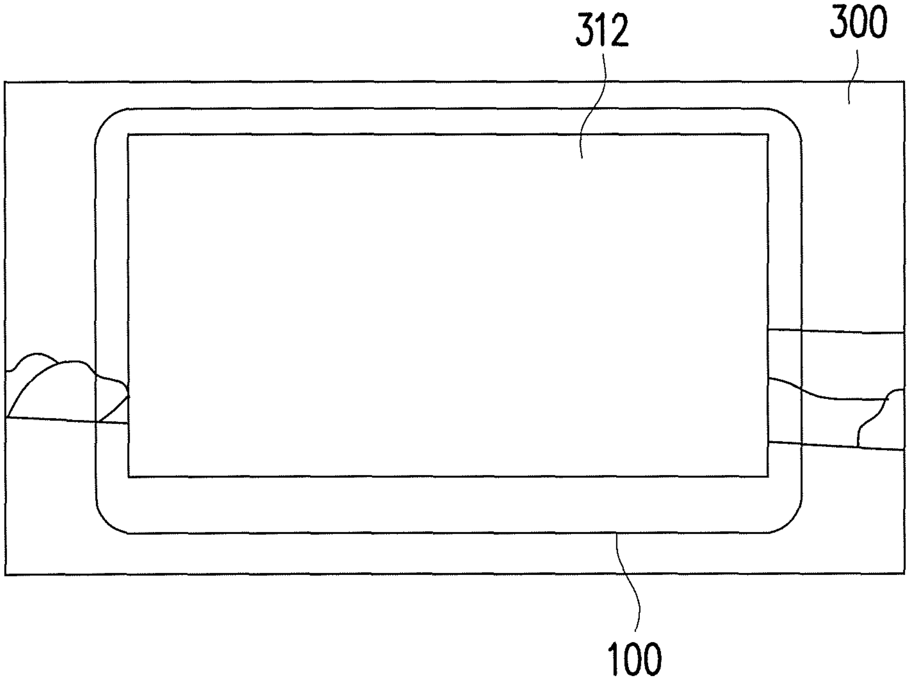
FIG. 3A to FIG. 3D are schematic diagrams respectively illustrating a display state according to the embodiment of FIG. 2.
Figure 3B:
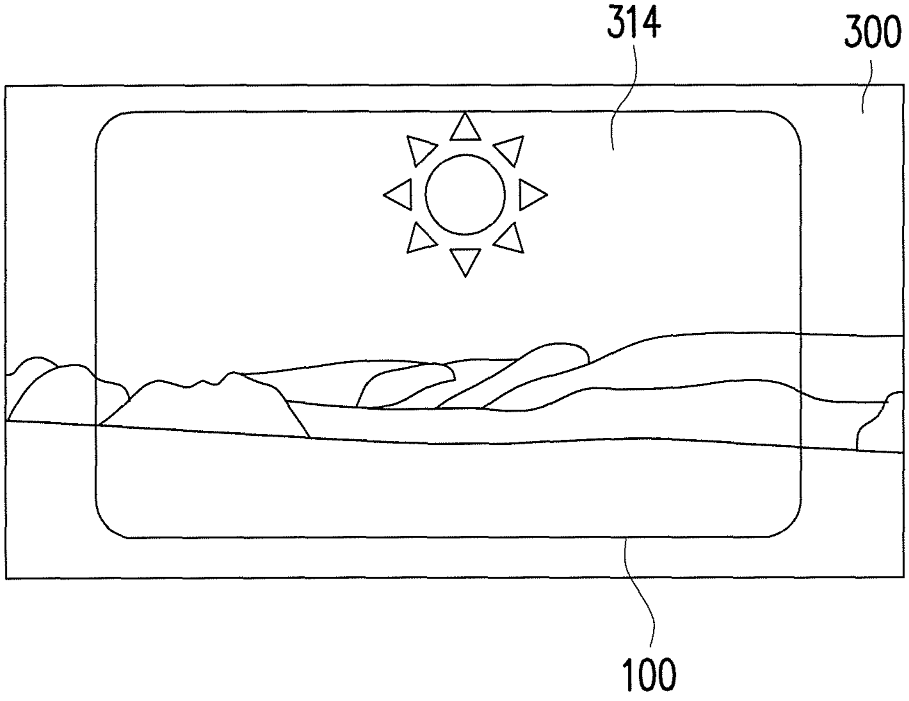
Figure 3C:
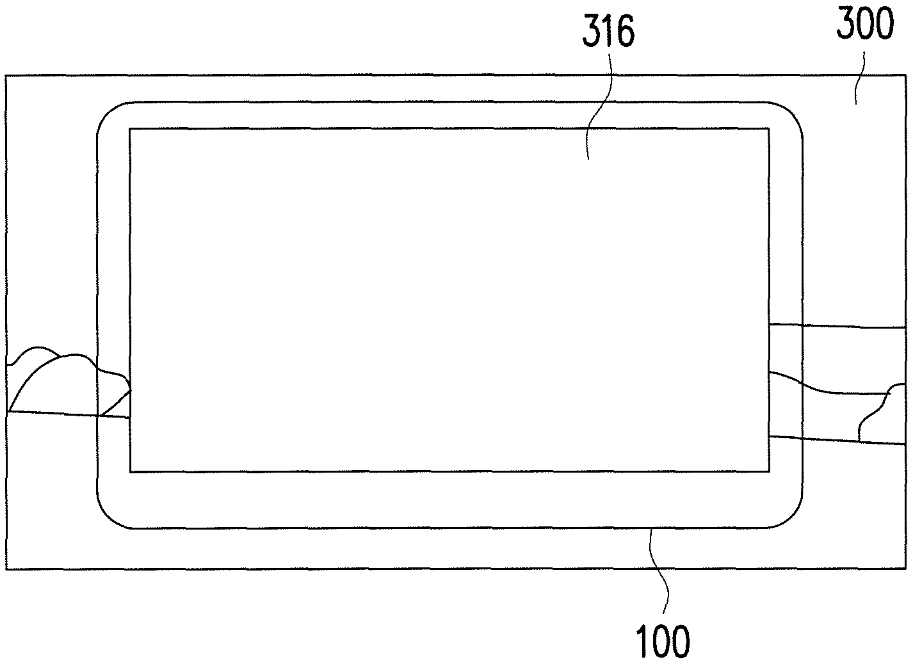
Figure 3D:
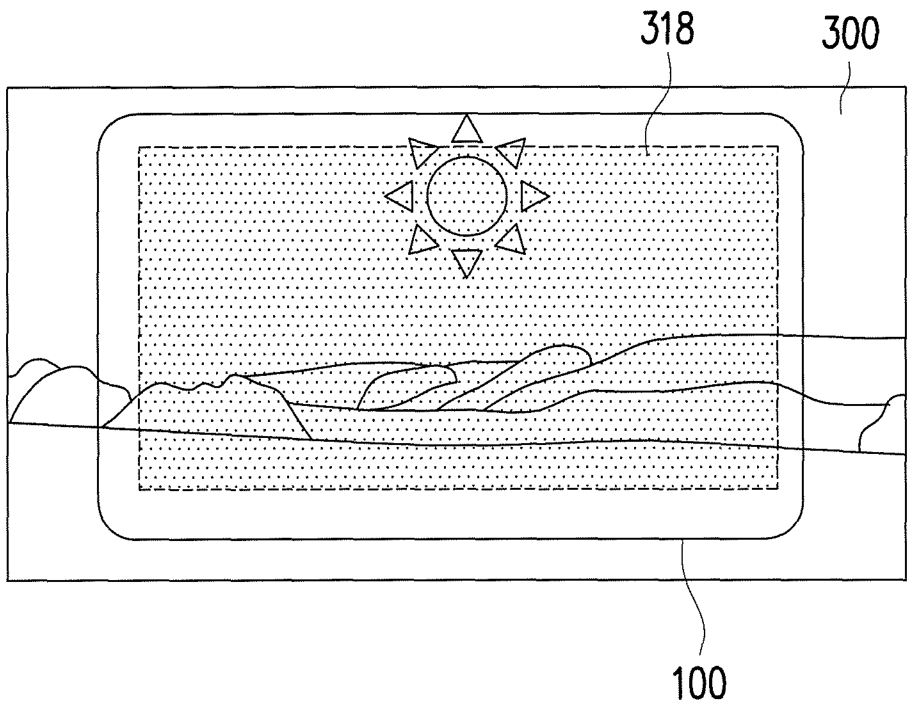

Referring to FIG. 3A to FIG. 3D, FIG. 3A to FIG. 3D are schematic diagrams respectively illustrating a display state according to the embodiment of FIG. 2. In the embodiments of FIG. 3A to FIG. 3D, the transparent display apparatus 100 may be placed in front of a background 300. As illustrated in FIG. 3A, an image frame 312 may be displayed with the black state listed in Table 1, where the image frame 312 may be in a color of black, and the background 300 behind the image frame 312 may be invisible. As illustrated in FIG. 3B, an image frame 314 may be displayed with the transparent state listed in Table 1, where the background 300 behind the image frame 314 may be visible. As illustrated in FIG. 3C, an image frame 316 may be displayed with the white state listed in Table 1, where the image frame 316 may be in a color of white, and the background 300 behind the image frame 316 may be invisible. As illustrated in FIG. 3D, an image frame 318 may be displayed with the combination of the white state and the transparent state listed in Table 1, where the image frame 318 may be in a color of white, and the background 300 behind the image frame 318 may be visible.

Figure 4A:
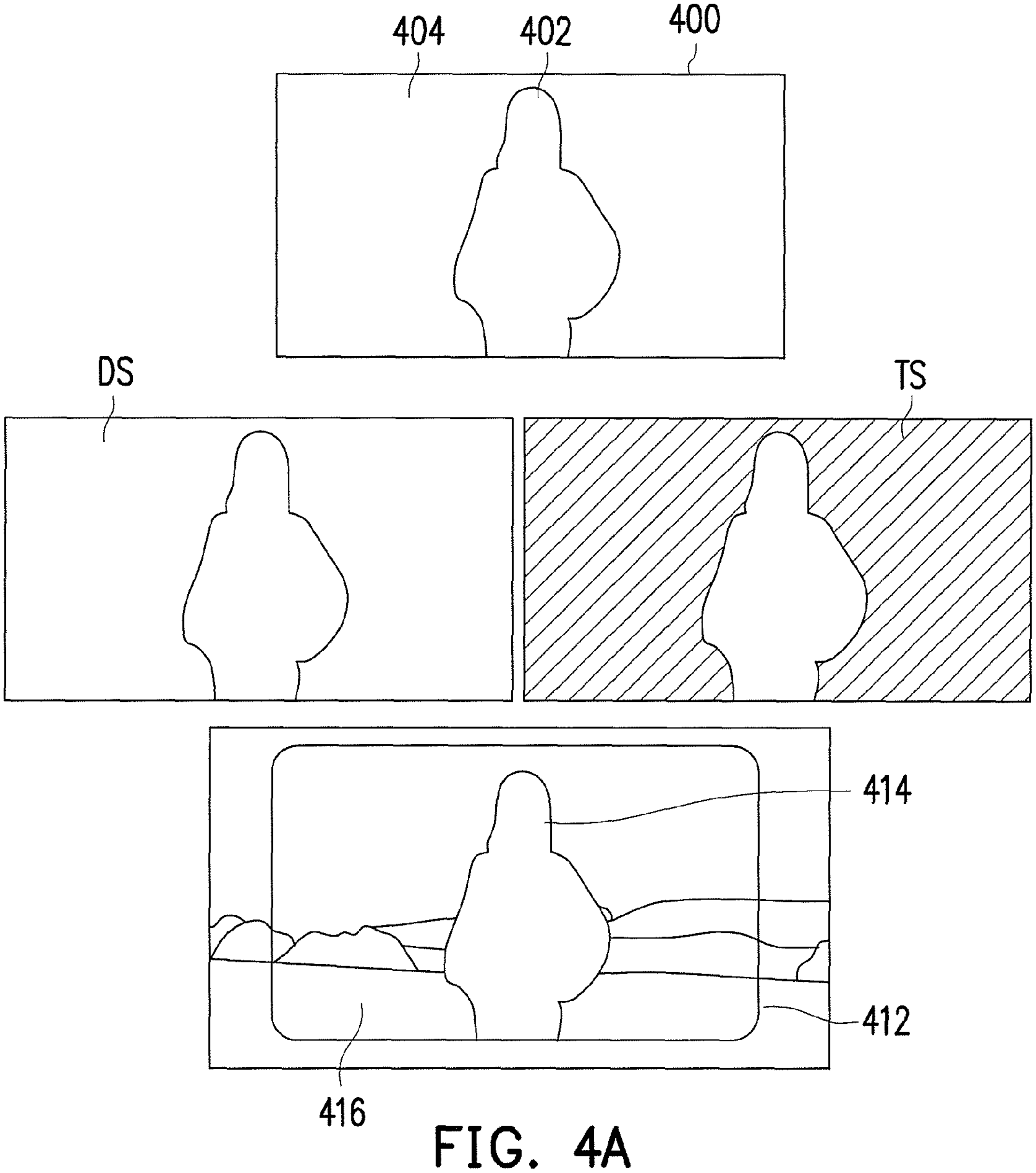
FIG. 4A illustrates an example according to the embodiment of FIG. 2.

Referring to FIG. 4A, FIG. 4A illustrates an example according to the embodiment of FIG. 2. In this example, an original image frame 400, which includes a black object 402 with a black background 404, is expected to be displayed as an image frame 412, which includes a black object 414 with a transparent background 416 on the transparent display unit 110. The signal strength of the transparency control signal TS corresponding to the black object 402 may be 0, and the signal strength of the transparency control signal TS corresponding to the black background 404 may be 1. Besides, the gray-level value of the display data signal DS corresponding to the black object 402 and the black background 404 may be both 0. Accordingly, by using the display data signal DS to control the first transparent display panel 212 (particularly the at least one first pixel of the first pixel group) and by using the transparency control signal TS to control the second transparent display panel 214 (particularly the at least one second pixel of the second pixel group), the black object 414 in the image frame 412 may be displayed with the black state, and the transparent background 416 in the image frame 412 may be displayed with the transparent state.

Figure 4B:
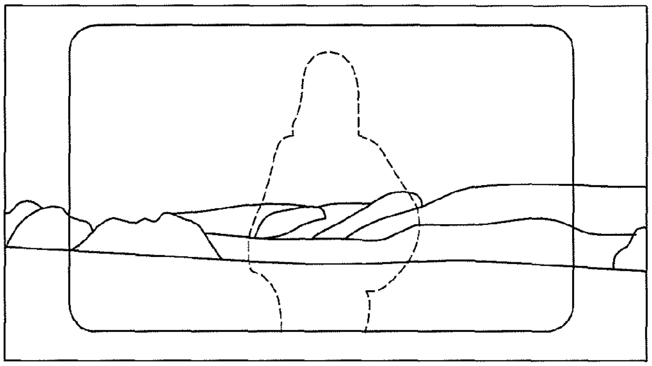
FIG. 4B illustrates an example according to a conventional transparent display apparatus.

It should be noted that, for a conventional transparent display apparatus, since the minimal gray-level value (i.e., a black state) may be applied for displaying the transparent state, both the black object 402 and the black background 404 may be displayed with the transparent state (as shown in FIG. 4B, which illustrates an example according to a conventional transparent display apparatus), such that the black object 402 may be unrecognized, and thus the display effects of the conventional transparent display apparatus may be degraded.

In some embodiment, the controller 120 may adaptively adjust the display data signal DS to improve the display effect of the transparent state based on the transparency control signal TS. From another perspective, a weight of the transparency control signal TS may be higher than that of the display data signal DS.

Figure 5A:
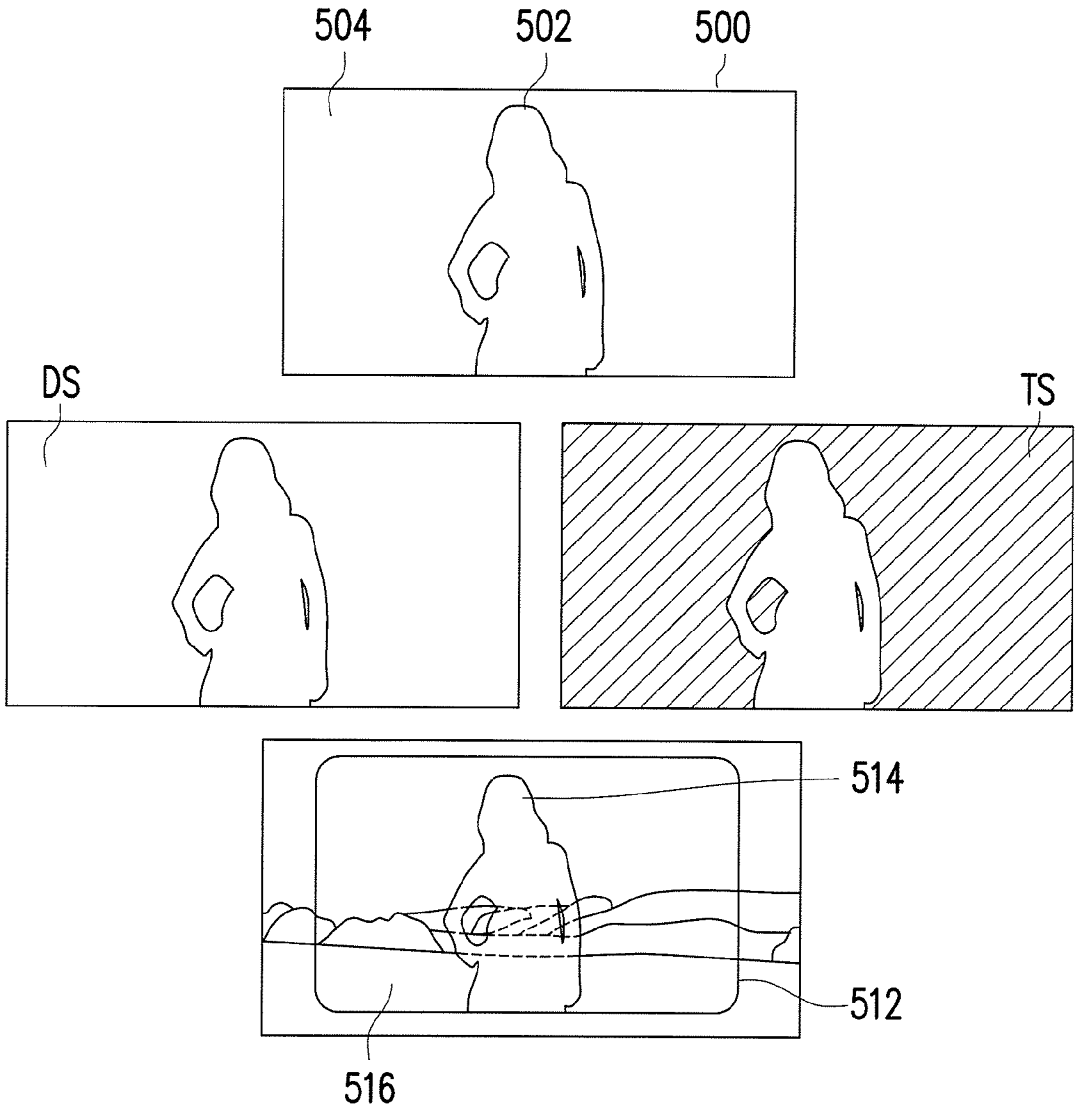
FIG. 5A illustrates another example according to the embodiment of FIG. 2.

Referring to FIG. 5A, FIG. 5A illustrates another example according to the embodiment of FIG. 2. In this example, an original image frame 500, which includes a white object 502 with a white background 504, is expected to be displayed as an image frame 512, which includes a white object 514 with a transparent background 516 on the transparent display unit 110. The signal strength of the transparency control signal TS corresponding to the white object 502 may be 0, and the signal strength of the transparency control signal TS corresponding to the white background 504 may be 1. Besides, the gray-level value of the display data signal DS corresponding to the white object 502 may be 1. It is worth mentioning that the gray-level value of the display data signal DS corresponding to the white background 504 may be adjusted to 0, since the transparency control signal TS adjusts the white background 504 to be displayed with a maximum degree of the transparency (i.e., the signal strength of 1). Accordingly, by using the display data signal DS to control the first transparent display panel 212 (particularly the at least one first pixel of the first pixel group) and by using the transparency control signal TS to control the second transparent display panel 214 (particularly the at least one second pixel of the second pixel group), the white object 514 in the image frame 512 may be displayed with the white state, and the transparent background 516 in the image frame 512 may be displayed with the transparent state.

Figure 5B:
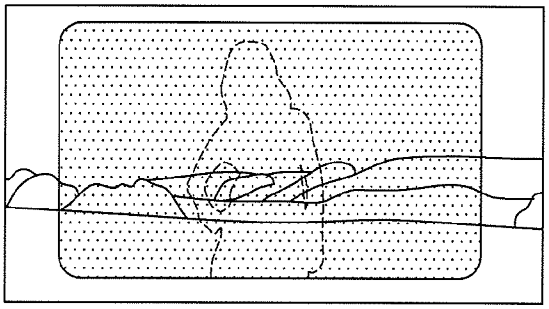
FIG. 5B illustrates another example according to a conventional transparent display apparatus.

It should be noted that, for a conventional transparent display apparatus, since the maximal gray-level value (i.e., the white state) may be applied for displaying the white state, both the white object 502 and the white background 504 may be displayed as the white state (as shown in FIG. 5B, which illustrates another example according to a conventional transparent display apparatus), such that the white object 502 may be unrecognized with reference to the white background 504, and thus the display effects of the conventional transparent display apparatus may be degraded.

The aforementioned maximum or the minimum of the signal strength of the transparency control signal TS are merely exemplary values for convenient description. In the following embodiment, it may be flexible for the controller 120 to adaptively adjust the transparency and the corresponding control region thereof of the image frame according to different values of signal strength of the transparency control signal TS.

Figure 6:
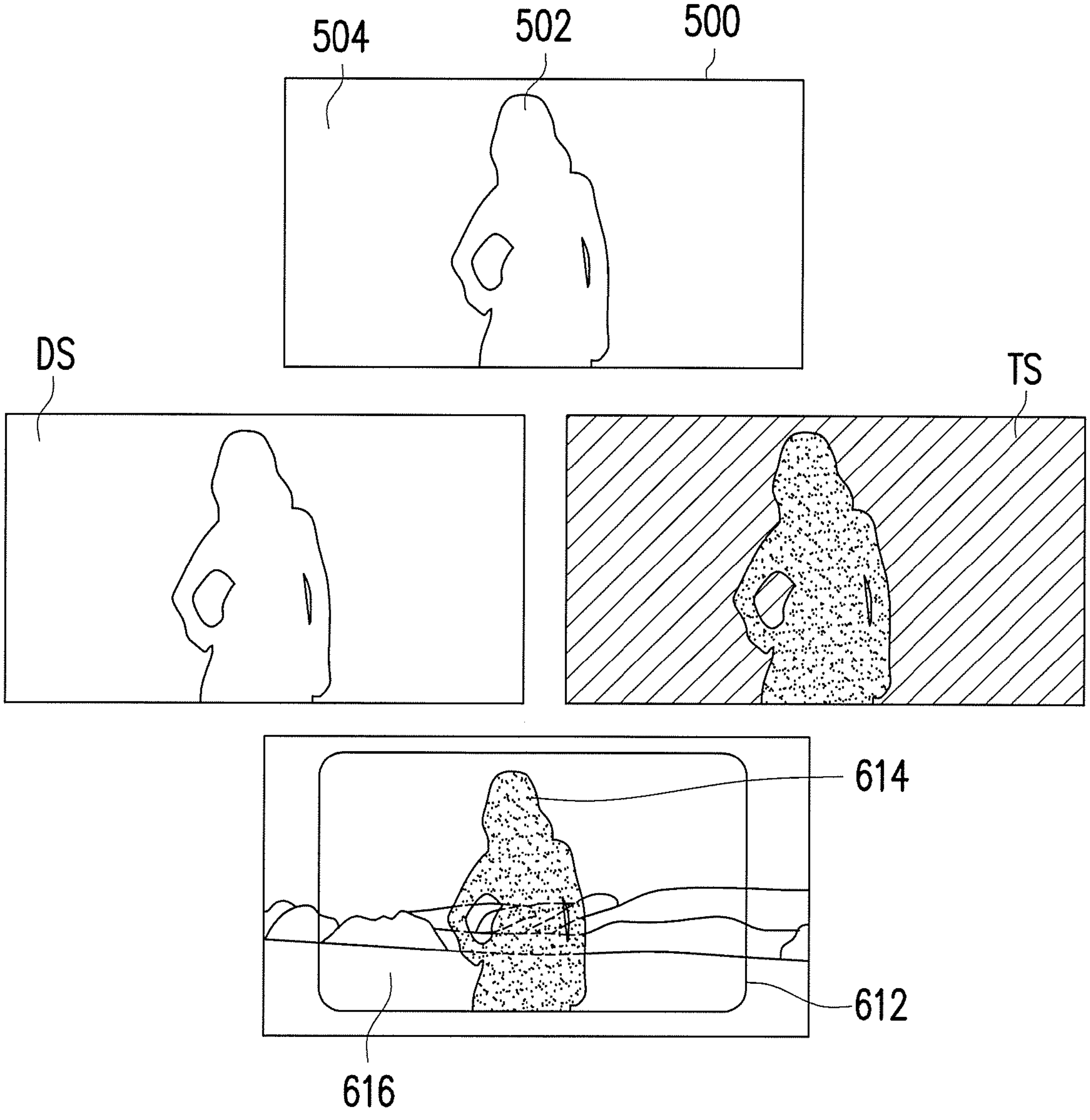
FIG. 6 illustrates another example according to the embodiment of FIG. 2.

Referring to FIG. 6, FIG. 6 illustrates another example according to the embodiment of FIG. 2. The embodiment of FIG. 6 is similar to the embodiment of FIG. 5A, so similarities will not be explained. In the embodiment of FIG. 6, the signal strength of the transparency control signal TS corresponding to the white object 502 may be 0.5, and therefore a white object 614 in an image frame 612 may be displayed with a combination of the white state and the transparent state. As for a transparent background 616 in the image frame 612, it may be displayed with the transparent state, which is similar as the transparent background 516 in the image frame 512 disclosed by the embodiment of FIG. 5A.

Moreover, the transparency control signal TS may be used for adjusting the transparency of a particular region in the image frame. Specifically, in an embodiment, the controller 120 may detect a control region of the transparency control signal TS in the image frame, and may adjust a transparency within the control region according to the signal strength of the transparency control signal TS.

Figure 7:
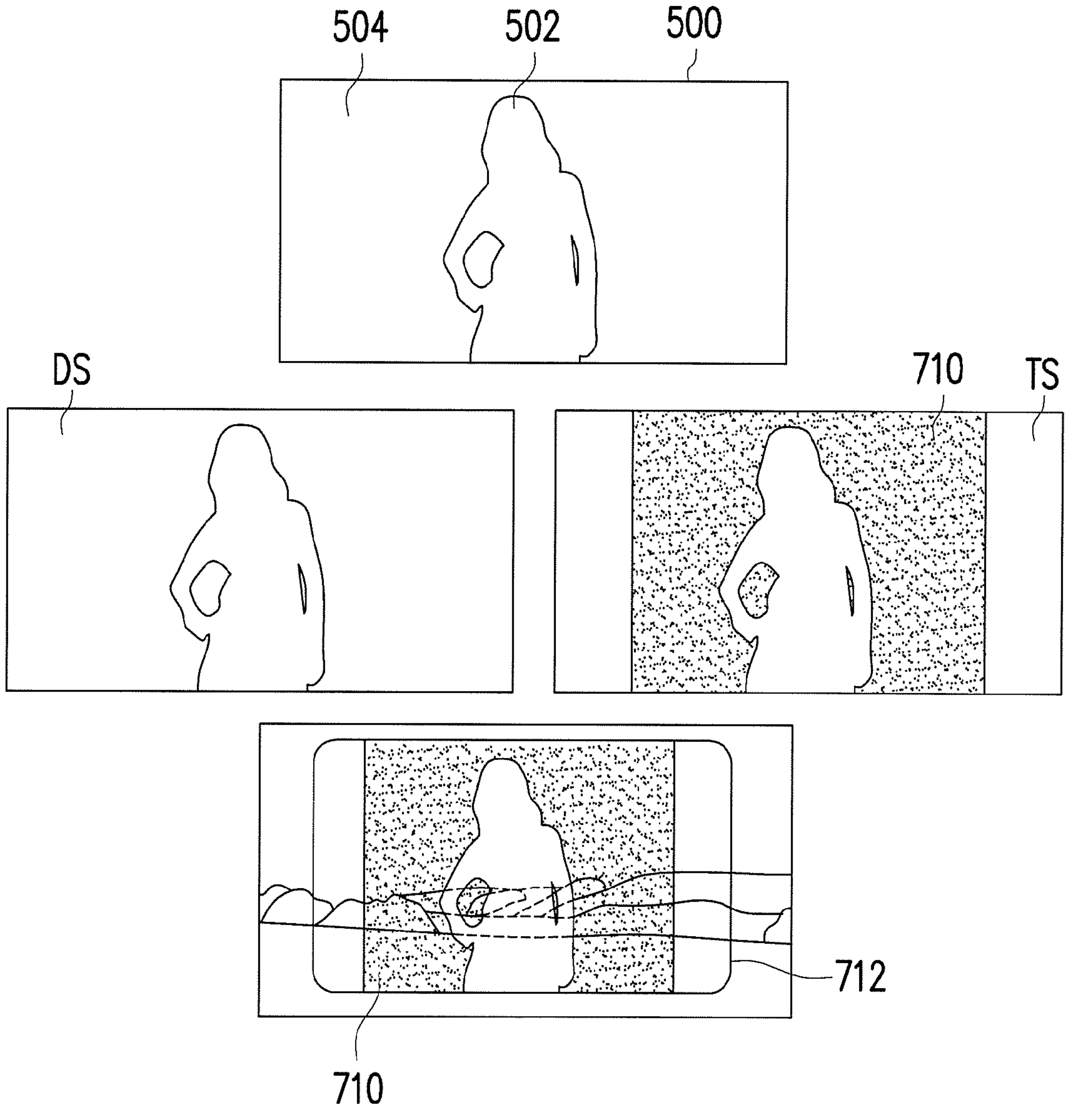
FIG. 7 illustrates another example according to the embodiment of FIG. 2.

Referring to FIG. 7, FIG. 7 illustrates another example according to the embodiment of FIG. 2. The embodiment of FIG. 7 is similar to the embodiment of FIG. 5A, so similarities will not be explained. In the present embodiment of FIG. 7, the transparency control signal TS may include information of a control region 710, such that the controller 120 may obtain that the signal strength of the transparency control signal TS corresponding to the control region 710 may be 0.5 (where the signal strength of the transparency control signal TS corresponding to the white object 502 may be 0, which is similar as the embodiment of FIG. 5A). Hence, the image frame 712 may include the control region 710 displayed with a transparency determined by a combination of the transparent state and the black state.

Based on the above, the embodiments disclosed by the invention may use the transparency control signal TS and the display data signal DS to determine the first and the second gradations, so as to simultaneously control and display the image frame according to the first and the second gradations. The transparency and the corresponding control region may be determined depending on the transparency control signal TS. Particularly, the configuration of the transparent display unit 110 including double transparent display panels may be provided, where the double transparent display panels may be controlled by the transparency control signal TS and the display data signal DS respectively. As a result, the transparent display unit 110 may be effectively controlled to display the image frame with the transparent state, the black state and the white state, so as to provide good display effects without sacrificing the display effect of the black state or the white state.

Figure 8:
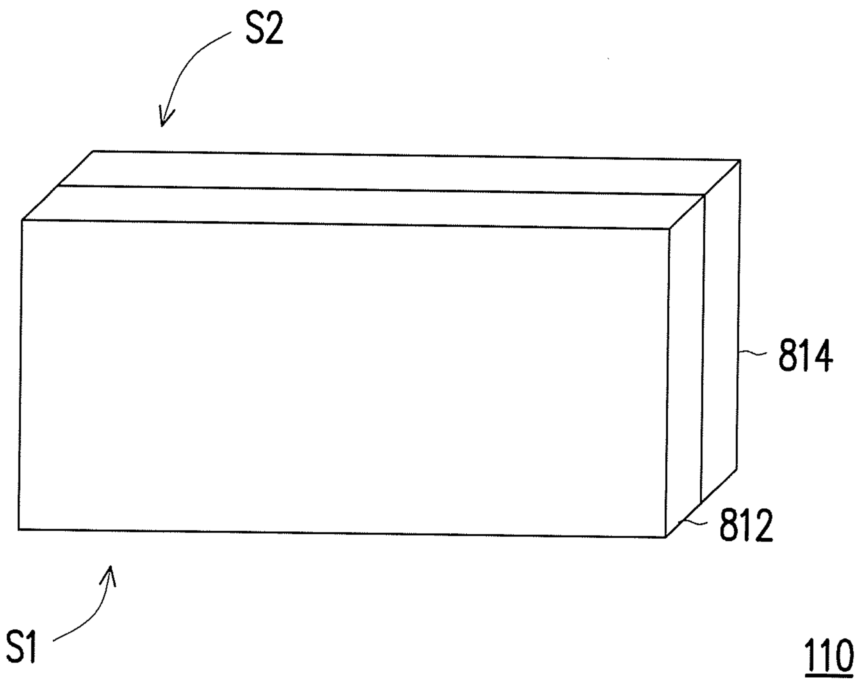
FIG. 8 is another schematic diagram illustrating a transparent display apparatus according to an embodiment of the invention.

Referring to FIG. 1 and FIG. 8, FIG. 8 is another schematic diagram illustrating a transparent display apparatus according to an embodiment of the invention, where a configuration of the transparent display unit 110 including two types of pixels may be provided as follows.

In the present embodiment, the controller 120 may determine the first gradation of the image frame within an interval from the black state to the white state according to the display data signal DS, and may determine the second gradation of the image frame within an interval from the black state to the transparent state according to the transparency control signal TS. Then, the controller 120 may control the transparent display unit 110 to display the image frame according to the first gradation and the second gradation, and may adjust a transparency of the image frame according to a signal strength of the transparency control signal TS.

Specifically, the transparent display unit 110 may include a plurality of pixels, and the pixels are divided into a first pixel group and a second pixel group, where the first pixel group is controlled by the display data signal DS, and the second pixel group is controlled by the transparency control signal TS. In addition, the transparent display unit 110 may include a third transparent display panel 812 and a shelter layer 814. The third transparent display panel 812 may be commonly configured by the first pixel group and the second pixel group, where each pixel of the second pixel group may be arranged adjacently to at least one pixel of the first pixel group. Besides, the shelter layer 814 may be arranged in parallel with the third transparent display panel 812, and may be used for sheltering each pixel of the first pixel group, and thus the each pixel of the first pixel group may be capable of displaying the black state. Similar to the embodiment of FIG. 2, the user may be located at the front side S1, and the background at the back side S2 of the transparent display apparatus 100 may be visible to the user.

Figure 9:
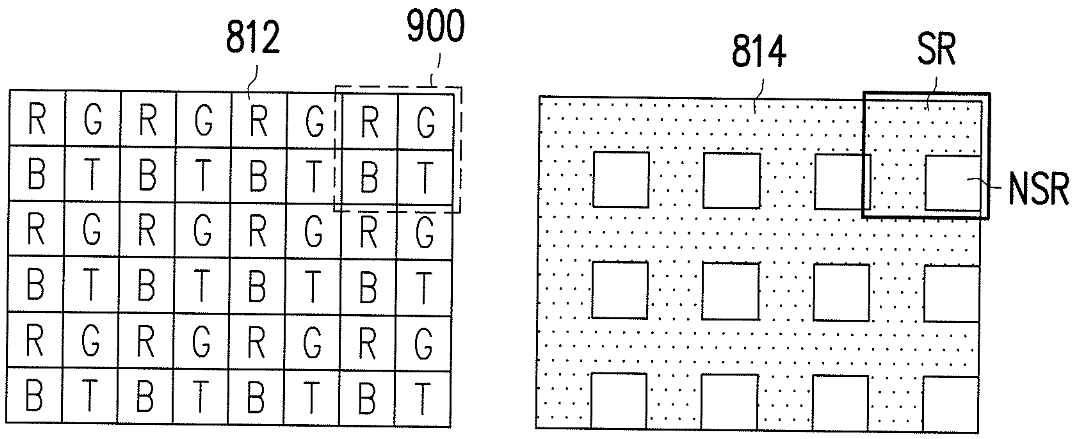
FIG. 9 is schematic diagram illustrating a pixel configuration according to the embodiment of FIG. 8.

Then, please referring to FIG. 9, FIG. 9 is schematic diagram illustrating a pixel configuration according to the embodiment of FIG. 8, which illustrates exemplary detailed configurations of the third transparent display panel 812 and the shelter layer 814. In the present embodiment, the third transparent display panel 812 may include a plurality of pixels T, R, G and B. The first pixel group may include a plurality of color sub-pixels (i.e., the pixels R, G and B, which may be indicated red pixels, green pixels and blue pixels respectively) for presenting colors, and the second pixel group may include a plurality of transparent sub-pixels (i.e., the pixels T) for controlling the transparency of the image frame. Further, a pixel unit 900 may be arranged repeatedly on the third transparent display panel 812, which may include a pixel R, a pixel G and a pixel B of the first pixel group and a pixel T of the second pixel group, where the pixels R, G and B in the pixel unit 900 may be arranged in L shape. On the other hand, the shelter layer 814 may include a sheltering region SR and a non-sheltering region NSR. The sheltering region SR may overlap with the pixels R, G, and B and the non-sheltering region NSR may overlap with the pixels T.

Accordingly, the controller 120 may determine the first gradation according to the gray-level part of the display data signal DS, and may control at least one first pixel (i.e., at least one color sub-pixel) of the first pixel group to operate with a first display state determined by the interval from the black state to the white state according to the first gradation. Besides, the controller 120 may determine the second gradation according to the signal strength of the transparency control signal TS, and may control at least one second pixel (i.e., at least one transparent sub-pixel) of the second pixel group to operate with a second display state determined by the interval from the black state to the transparent state according to the second gradation.

More specifically, in an embodiment, the first display state may be one of the black state and the white state, the second display state may be one of the black state and the transparent state, and the controller 120 may control to display the image frame with one of the transparent state, the white state and the black state according to the first display state and the second display state, where the at least one first pixel is arranged adjacently to the at least one second pixel.

Thus, from a perspective of a pixel unit (e.g., the pixel unit 900 including the pixels R, G, B (i.e., three first pixels) and the pixel T (i.e., a second pixel)), if the gray-level part of the display data signal DS is represented within an interval from 0 (e.g., a gray-level value corresponding to the black state) to 1 (e.g., a gray-level value corresponding to the white state), the controller 120 may set the first gradation to be proportional to the gray-level value of the display data signal DS (e.g., same as the gray-level value). The controller 120 may use the first gradation as a first combining ratio for combining the black state and the white state, so as to determine the first display state which the first pixel (i.e., each of the pixels R, G and B) may operate with. Similarly, if the signal strength of the transparency control signal TS is represented within an interval from 0 (e.g., a strength value corresponding to the black state) to 1 (e.g., a strength value corresponding to the transparent state), the controller 120 may set the second gradation to be proportional to the signal strength of the transparency control signal TS, and may use the second gradation as a second combining ratio for combining the black state and the transparent state, so as to determine the second display state which the second pixel (i.e., the pixel T) may operate with.

Then, by a superposition of the first display states presented by the first pixels (e.g., the pixels R, G, and B in the pixel unit 900) and the second display state presented by the second pixel (e.g., the pixel T in the pixel unit 900), the image frame may be displayed with all of the transparent state, the black state and the white state.

In particular, when the first display state is one of the black state and the white state (i.e., the gray-level value of the display data signal DS is 0 and 1, respectively) and the second display state is one of the black state and the transparent state (i.e., the strength value of the transparency control signal TS is 0 and 1, respectively), the controller 120 may control to display the image frame with one of the transparent state, the white state and the black state according to the first display state and the second display state. The superposition results of the first display state and the second display state according to the display data signal DS and the transparency control signal TS according to the embodiments of FIG. 8 and FIG. 9 are listed in Table 2 below.

TABLE 2

| Gray-level value of display data signal | Strength value of transparency control signal | Superposition of first display state and second display state |
|---|---|---|
| 0 | 0 | Black state |
| 0 | 1 | A combination of the black state and the transparent state |
| 1 | 0 | A combination of the black state and the white state |
| 1 | 1 | A combination of the white state and the transparent state |

It should be noted that, based on the configuration of the transparent display unit 110 disclosed in FIG. 8 and FIG. 9, the pixels R, G, and B may be regarded as a display region of the third transparent display panel 812, and the pixels T may be regarded as a transparent region of the third transparent display panel 812. In addition, the pixels R, G, B and T may be electrowetting display pixels. However, the invention is not intended to limit thereto.

Besides, similar to the aforementioned embodiments (e.g., the embodiment in FIG. 7), the transparency control signal TS in the present embodiment may be also used for determining the transparency and the corresponding control region, and thus may not be mentioned here.

It is also worth mentioning that the pixel arrangement disclosed by the embodiment of FIG. 9 may be merely exemplary. In other embodiments, the pixels R, G, B and T in a pixel unit may be arranged adjacently in a stripe arrangement along a horizontal direction or along a vertical direction, which may be adaptively adjusted based on design requirements, and the invention is not intended to limit thereto.

In the following embodiments, another configuration of the transparent display unit 110 for adjusting a light polarization may be provided.

Specifically, the transparent display unit 110 may include a liquid crystal layer and a polarization element. The controller 120 may control an arranging direction of a plurality of liquid crystal molecules in the liquid crystal layer according to the gray-level part of the display data signal DS, and may control a polarization direction of the polarization element according to the transparency control signal TS. In other words, the controller 120 may simultaneously use the display data signal DS and the transparency control signal TS for control the light polarization of the transparent display unit 110, so as to control the transparent display unit 110 being capable of displaying the image frame with the transparent state, the black state and the white state.

Figure 10A:
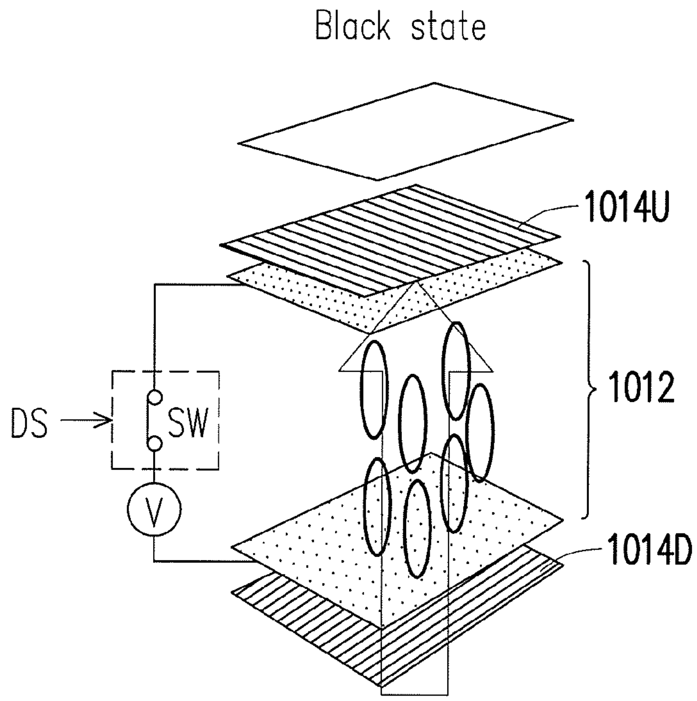
FIG. 10A to FIG. 10C are schematic diagrams respectively illustrating a display state according to an embodiment of the invention.
Figure 10B:
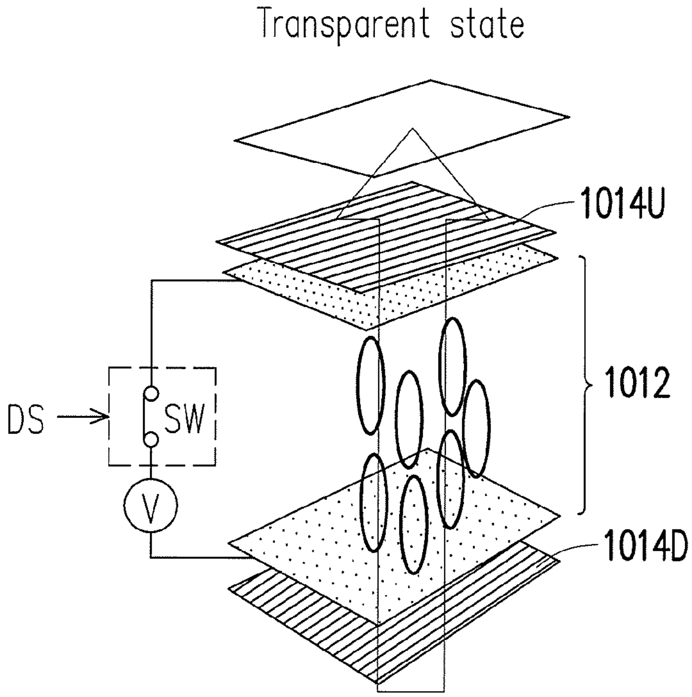
Figure 10C:
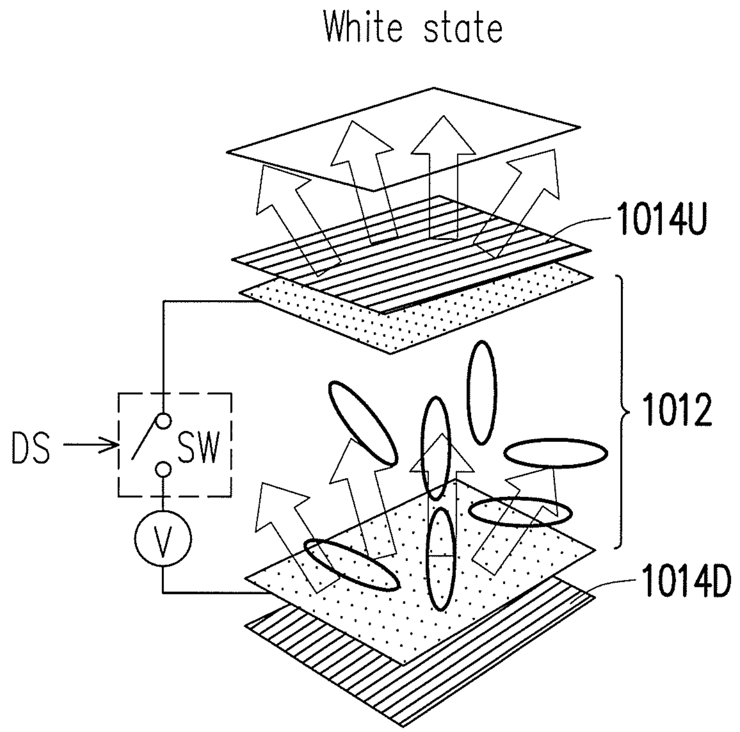

Referring to FIG. 10A to FIG. 10C, FIG. 10A to FIG. 10C are schematic diagrams respectively illustrating a display state according to an embodiment of the invention. In the embodiments of FIG. 10A to FIG. 10C, the transparent display unit 110 may include a liquid crystal layer 1012 and a polarization element, where the polarization element may include a first polarization unit 1014U and a second polarization unit 1014D. The controller 120 may control an angle between a first polarized axial of the first polarization unit 1014U and a second polarized axial of the second polarization unit 1014D according to the signal strength of the transparency control signal TS, and may determine the polarization direction according to the angle. In addition, the controller 120 may control an electrical field according to the gray-level part of the display data signal DS, and may determine the arranging direction of the liquid crystal molecules in the liquid crystal layer 1012 according to the electrical field.

More specifically, the controller 120 may determine a first gradation of the image frame within an interval from the transparent state to the white state according to the arranging direction of the liquid crystal molecules, and may determine a second gradation of the image frame within an interval from a black state and the transparent state according to the polarization direction of the polarization element. Then, the controller 120 may control the transparent display unit 110 to display the image frame according to the first gradation and the second gradation.

Particularly, the controller 120 may determine a first display state to be the black state or the transparent state by controlling the first polarized axial of the first polarization unit 1014U and the second polarized axial of the second polarization unit 1014D orthogonal or parallel to each other, and may determine a second display state to be the transparent state or the white state by controlling the arranging direction of the liquid crystal molecules standing or scattered. Then, the controller 120 may control to display the image frame with one of the transparent state, white state and black state according to the first display state and the second display state.

For instance, the controller 120 may use the display data signal DS to control a switch SW to be turned on or off. When the gray-level part of the display data signal DS is 0 (e.g., a gray-level value corresponding to the transparent state), the switch SW may be turned on, and a voltage V may be provided for generating an electrical field to control the liquid crystal molecules standing vertically. Besides, when the gray-level part of the display data signal DS is 1 (e.g., a gray-level value corresponding to the white state), the switch SW may be turned off, and the voltage V may not be provided, such that the electrical field may disappear, and the liquid crystal molecules may be controlled scattered.

Moreover, when the signal strength of the transparency control signal TS is 0 (e.g., a strength value corresponding to the black state), the first polarization unit 1014U and the second polarization unit 1014D may be arranged in perpendicular to each other, which may block the light to penetrate the transparent display unit 110. When the signal strength of the transparency control signal TS is 1 (e.g., a strength value corresponding to the transparent state), the first polarization unit 1014U and the second polarization unit 1014D may be arranged in parallel, which may allow the light to penetrate the transparent display unit 110.

In other words, in the present embodiment, the display data signal DS may be used for determining the first display state to be one of the transparent state and the white state. Besides, the transparency control signal TS may be used for determining the second display state to be one of the black state and the transparent state. Moreover, by a superposition of the first display state presented by the liquid crystal layer 1012 and the second display state presented by the first polarization unit 1014U and the second polarization unit 1014D, the image frame may be truly displayed with all of the transparent state, the black state and the white state.

Based on the above, the superposition results of the first display state and the second display state according to the display data signal DS and the transparency control signal TS according to the embodiments of FIG. 10A to FIG. 10C are listed in Table 3 below, where FIG. 10A to FIG. 10C illustrate the black state, the transparent state and the white state respectively.

TABLE 3

| Gray-level value of display data signal | Strength value of transparency control signal | Superposition of first display state and second display state |
|---|---|---|
| 0 | 0 | Black state |
| 0 | 1 | Transparent state |
| 1 | 0 | A combination of the black state and the white state |
| 1 | 1 | White state |

Besides, similar to the aforementioned embodiments (e.g., the embodiment in FIG. 7), the transparency control signal TS in the present embodiment may be also used for determining the transparency and the corresponding control region, and the controller 120 may also adaptively adjust the display data signal DS to improve the display effect of the transparent state based on the transparency control signal TS, which may be similar to the aforementioned embodiments, and thus details may not be mentioned here.

It should be noted that, in the aforementioned embodiment, the value of the signal strength of the transparency control signal TS and the value of the gray-level part of the display data signal DS may be merely examples. In other embodiments, the transparency control signal TS and the display data signal DS may be varied in a range, for example, from 0 to 255 (i.e., expressed by 8 bits) or other values. The invention is not intended to limit thereto.

Figure 11:
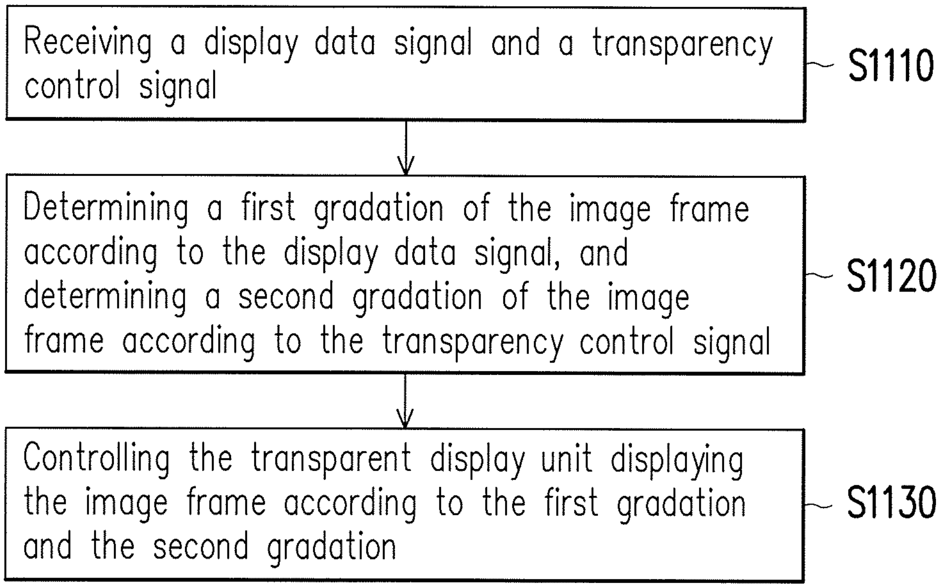
FIG. 11 is a flow chart illustrating a control method by using dual signals adapted to a transparent display apparatus according to an embodiment of the invention.

From another perspective, the embodiments of the invention may provide a control method by using dual signals adapted to a transparent display apparatus. Referring to FIG. 11, in Step S1110, the controller receives a display data signal and a transparency control signal. In Step S1120, the controller determines a first gradation of the image frame according to the display data signal, and may determine a second gradation of the image frame according to the transparency control signal. It should be noted that each of the first gradation and the second gradation may be within an interval determined by two of the transparent state, the black state and the white state, such that the first gradation and the second gradation may cover all the display effects of the transparent state, the black state and the white state. In Step S1130, the controller controls the transparent display unit displaying the image frame according to the first gradation and the second gradation. It should be noted that, depending on different configurations of the transparent display unit, details of Step S1120 may be adaptively adjusted, which may be described in the aforementioned embodiments in detail.

To conclude the above, the embodiments disclosed by the invention may simultaneously use the dual signals including the display data signal and the transparency control signal to determine the first gradation and the second gradation. Based on the first gradation and the second gradation, two display states may be determined respectively, and hence the superposition of the two display states may cover all the display effects of the transparent state, the black state and the white state. Besides, the transparency and the corresponding control region may be effectively controlled by the transparency control signal. Further, the dual signals may be applied to control appropriate designs of the transparent display unit, such as the configuration of double transparent display panels, the configuration of two types of pixels, and the configuration for adjusting the light polarization. Therefore, the image frame may be displayed with each of the transparent state, the black state and the white state, so as to achieve good display effects and user experience.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A transparent display apparatus, comprising:

a transparent display unit, displaying an image frame according to a display data signal and a transparency control signal; and a controller, coupled to the transparent display unit, receiving the display data signal and the transparency control signal, determining a first gradation of the image frame within an interval from a transparent state to a white state according to the display data signal, determining a second gradation of the image frame within an interval from a black state to the transparent state according to the transparency control signal, controlling the transparent display unit to display the image frame according to the first gradation and the second gradation, and adjusting a transparency of the image frame according to a signal strength of the transparency control signal.

2. The transparent display apparatus according to claim 1, wherein the controller detects a control region of the transparency control signal in the image frame, and adjusts a transparency within the control region according to the signal strength of the transparency control signal.

3. The transparent display apparatus according to claim 1, wherein the transparent display unit comprises a plurality of pixels, the plurality of pixels are divided into a first pixel group and a second pixel group, the first pixel group is controlled by the display data signal, and the second pixel group is controlled by the transparency control signal.

4. The transparent display apparatus according to claim 3, wherein the transparent display unit further comprises:

a first transparent display panel, configured by the first pixel group; and a second transparent display panel, arranged in parallel with the first transparent display panel, and configured by the second pixel group.

5. The transparent display apparatus according to claim 4, wherein the controller determines the first gradation according to a gray-level part of the display data signal, controls at least one first pixel of the first pixel group to operate with a first display state determined by the interval from the transparent state to the white state according to the first gradation, determines the second gradation according to the signal strength of the transparency control signal, and controls at least one second pixel of the second pixel group to operate with a second display state determined by the interval from the black state to the transparent state according to the second gradation.

6. The transparent display apparatus according to claim 5, wherein the first display state is one of the transparent state and the white state, the second display state is one of the black state and the transparent state, and the controller controls to display the image frame with one of the transparent state, the white state and the black state according to the first display state and the second display state, wherein the at least one first pixel overlaps with the at least one second pixel.

7. A transparent display apparatus, comprising:

a transparent display unit, displaying an image frame according to a display data signal and a transparency control signal; and a controller, coupled to the transparent display unit, receiving the display data signal and the transparency control signal, determining a first gradation of the image frame within an interval from a black state to a white state according to the display data signal, determining a second gradation of the image frame within an interval from the black state to a transparent state according to the transparency control signal, controlling the transparent display unit to display the image frame according to the first gradation and the second gradation, and adjusting a transparency of the image frame according to a signal strength of the transparency control signal.

8. The transparent display apparatus according to claim 7, wherein the controller detects a control region of the transparency control signal in the image frame, and adjusts a transparency within the control region according to the signal strength of the transparency control signal.

9. The transparent display apparatus according to claim 7, wherein the transparent display unit comprises a plurality of pixels, the plurality of pixels are divided into a first pixel group and a second pixel group, the first pixel group is controlled by the display data signal, and the second pixel group is controlled by the transparency control signal.

10. The transparent display apparatus according to claim 9, wherein the transparent display unit further comprises:

a third transparent display panel, configured by the first pixel group and the second pixel group, wherein each pixel of the second pixel group is arranged adjacently to at least one pixel of the first pixel group; and a shelter layer, arranged in parallel with the third transparent display panel, and sheltering each pixel of the first pixel group.

11. The transparent display apparatus according to claim 10, wherein the controller determines the first gradation according to a gray-level part of the display data signal, controls at least one first pixel of the first pixel group to operate with a first display state determined by the interval from the black state to the white state according to the first gradation, determines the second gradation according to the signal strength of the transparency control signal, and controls at least one second pixel of the second pixel group to operate with a second display state determined by the interval from the black state to the transparent state according to the second gradation.

12. The transparent display apparatus according to claim 11, wherein the first display state is one of the black state and the white state, the second display state is one of the black state and the transparent state, and the controller controls to display the image frame with one of the transparent state, the white state and the black state according to the first display state and the second display state, wherein the at least one first pixel is arranged adjacently to the at least one second pixel.

13. The transparent display apparatus according to claim 9, wherein the first pixel group comprises a plurality of color sub-pixels, and the second pixel group comprises a plurality of transparent sub-pixels for controlling the transparency of the image frame.

14. A transparent display apparatus, comprising:

a transparent display unit, comprising a liquid crystal layer and a polarization element, displaying an image frame according to a display data signal and a transparency control signal; and a controller, coupled to the transparent display unit, receiving the display data signal and the transparency control signal, controlling an arranging direction of a plurality of liquid crystal molecules in the liquid crystal layer according to a gray-level part of the display data signal, controlling a polarization direction of the polarization element according to the transparency control signal, detecting a control region of the transparency control signal in the image frame, and adjusting a transparency within the control region according to the signal strength of the transparency control signal.

15. The transparent display apparatus according to claim 14, wherein the polarization element comprises a first polarization unit and a second polarization unit, and the controller controls an angle between a first polarized axial of the first polarization unit and a second polarized axial of the second polarization unit according to a signal strength of the transparency control signal, determines the polarization direction of the polarization element according to the angle, controls an electrical field according to the gray-level part of the display data signal, and determines the arranging direction of the liquid crystal molecules according to the electrical field.

16. The transparent display apparatus according to claim 15, wherein the controller determines a first gradation of the image frame within an interval from a transparent state to a white state according to the arranging direction of the liquid crystal molecules, determines a second gradation of the image frame within an interval from a black state and the transparent state according to the polarization direction of the polarization element, and controls the transparent display unit to display the image frame according to the first gradation and the second gradation.

17. The transparent display apparatus according to claim 16, wherein the controller determines a first display state to be the black state or the transparent state by controlling the first polarized axial and the second polarized axial orthogonal or parallel to each other, determines a second display state to be the transparent state or the white state by controlling the arranging direction of the liquid crystal molecules standing or scattered, and displays the image frame with one of the transparent state, the white state and the black state according to the first display state and the second display state.

* * * * *